United States Patent
Bossi et al.

(10) Patent No.: US 10,834,455 B2
(45) Date of Patent: Nov. 10, 2020

(54) INTEGRATING REAL-TIME TEXT WITH VIDEO SERVICES

(71) Applicant: AT&T Intellectual Property I, L.P., Atlanta, GA (US)

(72) Inventors: Burt J. Bossi, Indianapolis, IN (US); Matthew Myrick, North Bethesda, MD (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 25 days.

(21) Appl. No.: 16/020,471

(22) Filed: Jun. 27, 2018

(65) Prior Publication Data
US 2020/0007923 A1 Jan. 2, 2020

(51) Int. Cl.
| | | |
|---|---|---|
| H04N 21/431 | (2011.01) | |
| H04N 21/4788 | (2011.01) | |
| H04N 21/2187 | (2011.01) | |
| G06F 40/40 | (2020.01) | |
| G10L 15/26 | (2006.01) | |

(52) U.S. Cl.
CPC ......... H04N 21/4316 (2013.01); G06F 40/40 (2020.01); G10L 15/26 (2013.01); H04N 21/2187 (2013.01); H04N 21/4788 (2013.01)

(58) Field of Classification Search
CPC .... H04N 9/735; H04N 1/6052; H04N 1/6077; H04N 1/6027; H04N 5/23296; H04N 5/247
See application file for complete search history.

(56) References Cited

U.S. PATENT DOCUMENTS

| | | |
|---|---|---|
| 7,251,495 B2 | 7/2007 | Keyani et al. |
| 8,019,815 B2 | 9/2011 | Keener et al. |
| 8,140,980 B2 | 3/2012 | Gunasekar et al. |
| 8,701,020 B1 | 4/2014 | Fulcher et al. |
| 9,021,541 B2 | 4/2015 | Regis et al. |
| 9,247,400 B2 | 1/2016 | Butler |
| 9,275,046 B2 | 3/2016 | Rogowski et al. |
| 9,325,940 B2 | 4/2016 | Smelyansky |
| 9,473,627 B2 | 10/2016 | Thelin et al. |

(Continued)

FOREIGN PATENT DOCUMENTS

| | | |
|---|---|---|
| KR | 20110110895 A | 10/2011 |
| WO | WO 0228102 A1 | 4/2002 |
| WO | WO 2018027237 A1 | 2/2018 |

OTHER PUBLICATIONS

Beyer, Yngvil, et al. "Small talk makes a big difference: recent developments in interactive, SMS-based television." Television & New Media 8.3 (2007): 213-234. https://www.researchgate.net/profile/Gunn_Enli/publication/249829593_Small_Talk_Makes_a_Big_Difference_Recent_Developments_in_Interactive_SMSBased_Television/links/0deec527ce1a82c76d000000.pdf.

(Continued)

*Primary Examiner* — Michael E Teitelbaum

(57) ABSTRACT

In one example, real-time text (RTT) communications are integrated with video services. For instance, one method for integrating RTT communications with video services includes receiving a real time text call intended for a recipient in a home network, forwarding the real time text call to a first device in the home network, receiving a signal to redirect the real time text call to a second device in the home network that is different from the first device, and forwarding the real time text call to the second device, in response to the signal.

20 Claims, 4 Drawing Sheets

(56) References Cited

U.S. PATENT DOCUMENTS

| | | |
|---|---|---|
| 9,521,451 B2 | 12/2016 | Deweese et al. |
| 9,544,430 B2 | 1/2017 | Nachtrab et al. |
| 9,602,559 B1 | 3/2017 | Barros et al. |
| 2007/0155346 A1* | 7/2007 | Mijatovic ............... H04W 4/18 455/90.2 |
| 2007/0291107 A1 | 12/2007 | Kang |
| 2009/0015711 A1* | 1/2009 | Yamamoto ............ H04N 7/186 348/441 |
| 2010/0039498 A1 | 2/2010 | Liu et al. |
| 2011/0249593 A1* | 10/2011 | Jung ................... H04L 12/2809 370/254 |
| 2012/0034938 A1* | 2/2012 | Kreitzer ................ H04L 51/04 455/466 |
| 2014/0085334 A1 | 3/2014 | Payne |
| 2016/0030841 A1 | 2/2016 | Perlman et al. |
| 2017/0085506 A1 | 3/2017 | Gordon |
| 2017/0187876 A1 | 6/2017 | Hayes et al. |
| 2017/0255614 A1 | 9/2017 | Vukosavljevic et al. |
| 2017/0364484 A1* | 12/2017 | Hayes .................. G06F 17/214 |

OTHER PUBLICATIONS

Geerts, David. "Comparing voice chat and text chat in a communication tool for interactive television."Proceedings of the 4th Nordic conference on Humancomputer interaction: changing roles. ACM, 2006. https://www.researchgate.net/profile/David_Geerts/publication/221248313_Comparing_voice_chat_and_text_chat_in_a_communication_tool_for_interactive_television/links/09e415110ea5615399000000.pdf.

Welch, Chris, "Everything we know about T-Mobile's TV service coming in 2018,"The Verge, theverge.com, Dec. 15, 2017. https://www.theverge.com/2017/12/15/167815 40/tmobile-streaming-tvservice-features-rumors.pdf.

* cited by examiner

INTEGRATING REAL-TIME TEXT WITH VIDEO SERVICES

The present disclosure relates generally to telecommunications, and relates more particularly to devices, non-transitory computer-readable media, and methods for integrating real-time text communications with video services.

BACKGROUND

Approximately thirty-eight million people in the United States alone have some sort of significant hearing impairment. Certain technologies, such as hearing aids and cochlear implants, have been developed to compensate for some degree of hearing loss. In addition, services such as captioned telephones allow individuals with hearing impairments to communicate over the telephone.

Captioned telephones typically work by connecting the caller and callee through a captioned telephone service (CTS). At the CTS, a human intermediary transcribes spoken utterances into text captions, which are sent to a display of the captioned telephone.

SUMMARY

In one example, real-time text (RTT) communications are integrated with video services. For instance, one method for integrating RTT communications with video services includes receiving a real time text call intended for a recipient in a home network, forwarding the real time text call to a first device in the home network, receiving a signal to redirect the real time text call to a second device in the home network that is different from the first device, and forwarding the real time text call to the second device, in response to the signal.

In another example, a device includes a processor and a computer-readable medium storing instructions which, when executed by the processor, cause the processor to perform operations. The operations include receiving a real time text call intended for a recipient in a home network, forwarding the real time text call to a first device in the home network, receiving a signal to redirect the real time text call to a second device in the home network that is different from the first device, and forwarding the real time text call to the second device, in response to the signal.

In another example, a non-transitory computer-readable storage medium stores instructions which, when executed by a processor, cause the processor to perform operations. The operations include receiving a real time text call intended for a recipient in a home network, forwarding the real time text call to a first device in the home network, receiving a signal to redirect the real time text call to a second device in the home network that is different from the first device, and forwarding the real time text call to the second device, in response to the signal.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure integrates real-time text (RTT) communications with video services. As discussed above, services such as captioned telephones allow individuals with hearing impairments to communicate over the telephone. Captioned telephones typically work by connecting the caller and callee through a captioned telephone service (CTS). At the CTS, a human intermediary transcribes spoken utterances into text captions, which are sent to a display of the captioned telephone.

One drawback of captioned telephones is the lack of privacy, as a third party (i.e., the human intermediary) hears or sees every exchange. In addition, a delay is introduced between the speaking of an utterance and the appearance of the transcription on the captioned telephone display, as the text typically is not sent to the display until the entire utterance has been transcribed. As such, the natural flow of a conversation may be disrupted.

Examples of the present disclosure provide an application that allows a real time text (RTT) call received via a user's mobile telephone to be redirected to another nearby display, such as a television screen or a computer monitor. RTT is a technology, often available as a standard mobile network feature, that allows text-based messages to flow between devices character-by-character (i.e., as they are being typed or created). This stands in contrast to, for instance, short messaging service technology, which sends a text message at once, in its entirety. The application may be implemented in an over-the-top (OTT) manner, or as a native RTT application (e.g., if the mobile telephone has native RTT software installed thereon).

Thus, the text of the RTT call is displayed on the nearby display in real time as the caller is typing (subject to any network latency). As no human intermediary is needed to transcribe the spoken utterances, the privacy of the conversation is preserved. Moreover, because the text is sent to the display in real-time, character-by-character, the flow of the conversation is much more natural.

Although examples of the present disclosure are described within the context of providing services to individuals with hearing impairments, it will be appreciated that examples of the disclosure may be useful for individuals without hearing impairments as well. For instance, an individual could take a phone call while watching television or playing a video game, without having to mute or pause the television or game. In addition, the message payload of voice-to-RTT-to-screen and/or screen-to-RTT-to-voice communications may be better suited than strictly voice message payloads to reaching areas where voice coverage is less reliable (e.g., mountainous, rural, or other hard to reach areas).

Figure 1:
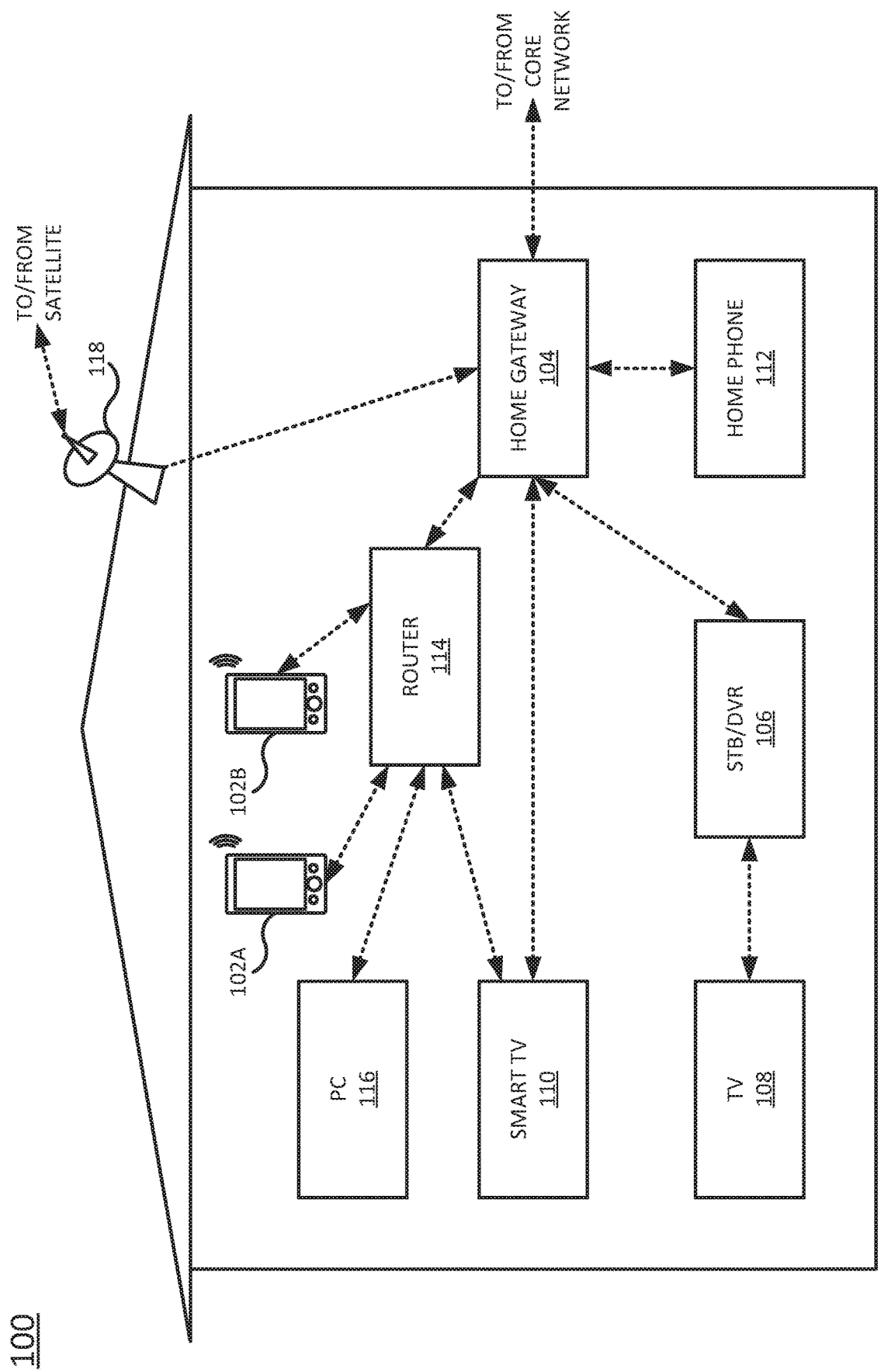
FIG. 1 illustrates an example home network related to the present disclosure.

To better understand the present disclosure, FIG. 1 illustrates an example home network 100 related to the present disclosure. As shown in FIG. 1, the home network 100 may be part of a larger communications network that connects mobile devices 102A and 102B, home gateway 104, set-top box (STB) 106, televisions (TV) 108 and 110, home phone 112, router 114, personal computer (PC) 116, and so forth, with one another and with various other devices outside of the home network 100 via a core network, a wireless access network (e.g., a cellular network), an access network, other networks, and/or the Internet (not shown).

For instance, a wireless access network such as a universal mobile telecommunications system (UMTS) network employing wideband code division multiple access (WCDMA) could connect devices in the home network 100 to a core network. Alternatively or in addition, an access network such as a Digital Subscriber Line (DSL) network, a broadband cable access network, a Local Area Network (LAN), a cellular or wireless access network, a $3^{rd}$ party network, and the like may connect devices in the home network 100 to the core network.

The core network may combine core network components of a cellular network with components of a triple play service network, where triple play services provide telephone services, Internet services, and television services to subscribers. For example, the core network may functionally comprise a fixed mobile convergence (FMC) network, e.g., an IP Multimedia Subsystem (IMS) network. In addition, the core network may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network may also further comprise a broadcast television network, e.g., a traditional cable provider network or an Internet Protocol Television (IPTV) network, as well as an Internet Service Provider (ISP) network.

The operator of core network may provide a cable television service, an IPTV service, or any other type of television service to the home network 100 via the access network(s). The access network(s) may also transmit and receive communications between home network 100 and the core network relating to voice telephone calls, communications with web servers via the Internet, and/or other networks, and so forth.

Alternatively, or in addition, the home network 100 may receive television services via satellite broadcast. For instance, a ground station in the core network may receive television content from one or more core network servers for uplink transmission to a satellite. Accordingly, the satellite may receive television content and/or metadata files from the ground station and may broadcast the television content to a satellite receiver 118 in the home network, e.g., a satellite link terrestrial antenna (including satellite dishes and antennas for downlink communications, or for both downlink and uplink communications), as well as to satellite receivers of other subscribers within a coverage area of the satellite. In one example, the satellite may be controlled and/or operated by a same network service provider as the core network. In another example, the satellite may be controlled and/or operated by a different entity and may carry television broadcast signals on behalf of the core network.

In one example, home network 100 may include a home gateway 104, which receives data/communications associated with different types of media (e.g., television, phone, and Internet) and separates these communications for the appropriate devices. The data/communications may be received via an access network and/or via the satellite receiver 118, as described above. In one example, television data files are forwarded to set-top box (STB)/digital video recorder (DVR) 106 to be decoded, recorded, and/or forwarded to television (TV) 108 for presentation. Television data files may also be forwarded directly to smart TV 110, which may decode, record, and present the data files without the assistance of an STB. Similarly, telephone data is sent to and received from home phone 112; Internet communications are sent to and received from router 114, which may be capable of both wired and/or wireless communication. In turn, router 114 receives data from and sends data to the appropriate devices, including the personal computer (PC) 116, mobile devices 102A and 102B, and so forth. In one example, router 114 may further communicate with smart TV 110. In one example, router 114 may comprise a wired Ethernet router and/or an Institute for Electrical and Electronics Engineers (IEEE) 802.11 (Wi-Fi) router, and may communicate with respective devices in home network 100 via wired and/or wireless connections.

In one example, each of mobile devices 102A and 102B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 102A and 102B may have both cellular and non-cellular access capabilities and may further have wired communication and networking capabilities.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, STB/DVR 106 may host an operating system for presenting a user interface via TV 108. In one example, the user interface may be controlled by a user via a remote control or other control devices which are capable of providing input signals to an STB/DVR. For example, mobile device 102A and/or mobile device 102B may be equipped with an application to send control signals to STB/DVR 106 via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 106 is similarly equipped to receive such a signal. Although STB/DVR 106 is illustrated and described as an integrated device with both STB and DVR functions, in other, further, and different examples, STB/DVR 106 may comprise separate STB and DVR components.

Those skilled in the art will realize that the home network 100 may be implemented in a different form than that which is illustrated in FIG. 1, or may be expanded by including additional endpoint devices, including smart home or Internet of Things (IoT) devices, etc. without altering the scope of the present disclosure. In addition, the core network is not limited to an IMS network, and the wireless access network is not limited to a UMTS/UTRAN configuration. Similarly, the present disclosure is not limited to an IP/MPLS network for VoIP telephony services, or any particular type of broadcast television network for providing television services, and so forth.

Figure 2:
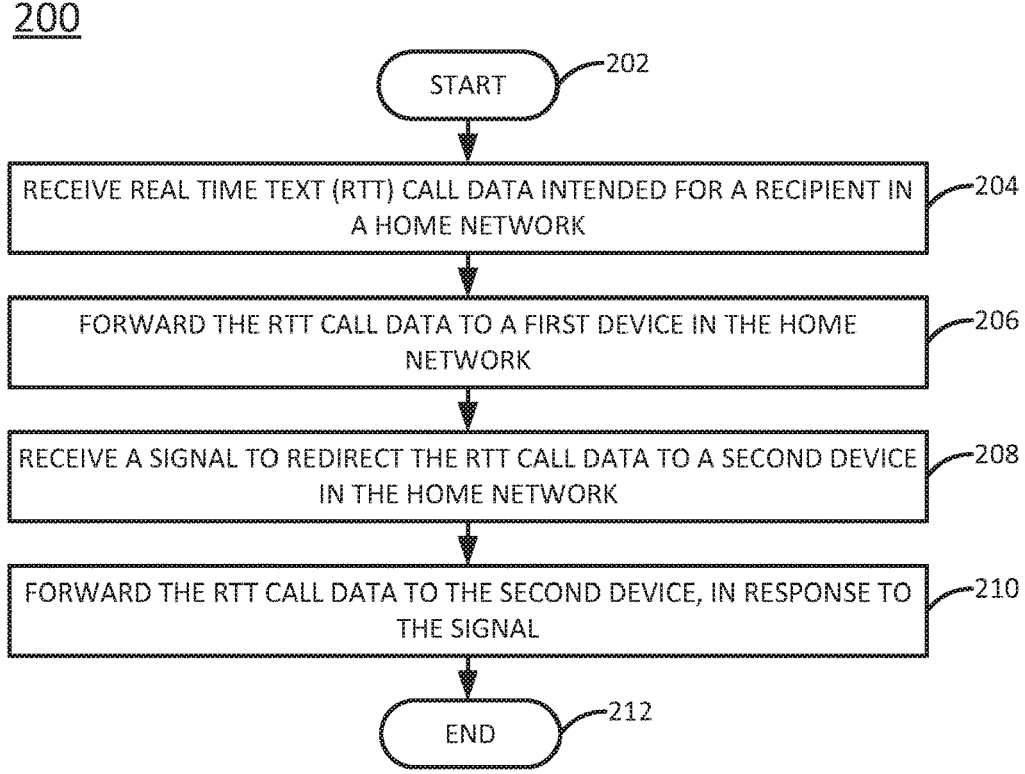
FIG. 2 illustrates a flowchart of an example method for integrating real-time text communications with video services in accordance with the present disclosure.

To further aid in understanding the present disclosure, FIG. 2 illustrates a flowchart of an example method 200 for integrating real-time text (RTT) communications with video services in accordance with the present disclosure. In one example, the method 200 may be performed by home gateway, such as the home gateway 104 illustrated in FIG. 1. However, in other examples, the method 200 may be performed by another device. As such, any references in the discussion of the method 200 to the home gateway 104 (or to any other components of FIG. 1) are made for the sake of example only, and are not intended to limit the means by which the method 200 may be performed.

The method 200 begins in step 202. In step 204, real time text (RTT) call data intended for a recipient in a home network is received. The RTT call data may be received simultaneously with data for at least one other type of media, such as television data files and/or Internet communications. The RTT call data may be received via an access network, as described above. In one example, the RTT call data may comprise text and/or image data (e.g., alphanumeric text, emoticons, still images, video, etc.).

In step 206, the RTT call data may be forwarded to a first device in the home network. For instance, in one example, the first device may be a landline telephone (e.g., home phone 112) or a mobile phone (e.g., mobile device 102A or 102B). In one example, the first device is a default device for receiving RTT calls.

In step 208, a signal may be received to redirect the RTT call data to a second device in the home network (i.e., a device different from the first device). In one example, the second device comprises a device that includes or is connected to a display, such as a smart television (e.g., smart TV 110), an STB connected to a television (e.g., STB/DVR 106), a router connected to a PC, tablet computing device, or mobile phone (e.g., router 114), or the like. In one example, the signal may be received from the first device. In another example, however, the signal may be received from another device, such as the second device.

For instance, the intended recipient in the home network may be watching television when he receives an RTT call on his mobile phone. He may wish to have the RTT call data associated with the RTT call redirected so that the RTT call data displays as text and/or images on the television display rather than have the RTT call data directed to the mobile phone, which has a much smaller screen.

In step 210, the RTT call data may be forwarded, in response to the signal received in step 208, to the second device.

For instance, continuing the above example, the RTT call data may be forwarded to the television (e.g., if the television is a smart or Internet-ready television) or to a STB/DVR connected to the television (e.g., if the television is not a smart or Internet-ready television). The television or the STB may process the RTT call data in order to display it, as described in further detail in FIG. 3.

The method 200 ends in step 212.

It will be appreciated that RTT call data may continue to be forwarded to the second device until a signal is received to stop forwarding the RTT call data or until no more RTT call data is received (e.g., the call ends). Moreover, call data may also be received from the second device (e.g., in the form of text/image data or voice/audio data) and transmitted outside of the home network to another party on the call. For instance, the intended recipient who is viewing the RTT call data on the second device may respond to the person with whom the intended recipient is conversing. The response could be provided in the form of text (e.g., real time text), or in the form of spoken utterances. Where the response comprises a spoken utterance, the second device (or another device to which the second device forwards the spoke utterance, such as an STB, a router, or a home gateway) may employ a microphone to record the spoken utterance and forward the recoding to the home gateway. The home gateway may then employ a speech recognition technique to convert the spoken utterance to text.

In further examples, the method 200 may include an additional step, e.g., between steps 208 and 210, in which at least one language translation application may be used to translate the RTT call data from a first language into a second, different language before the RTT call data is forwarded to the second device. For instance, the primary language spoken by the intended recipient of the RTT call data may be different from the primary language spoken by the person with whom the intended recipient is conversing.

Figure 3:
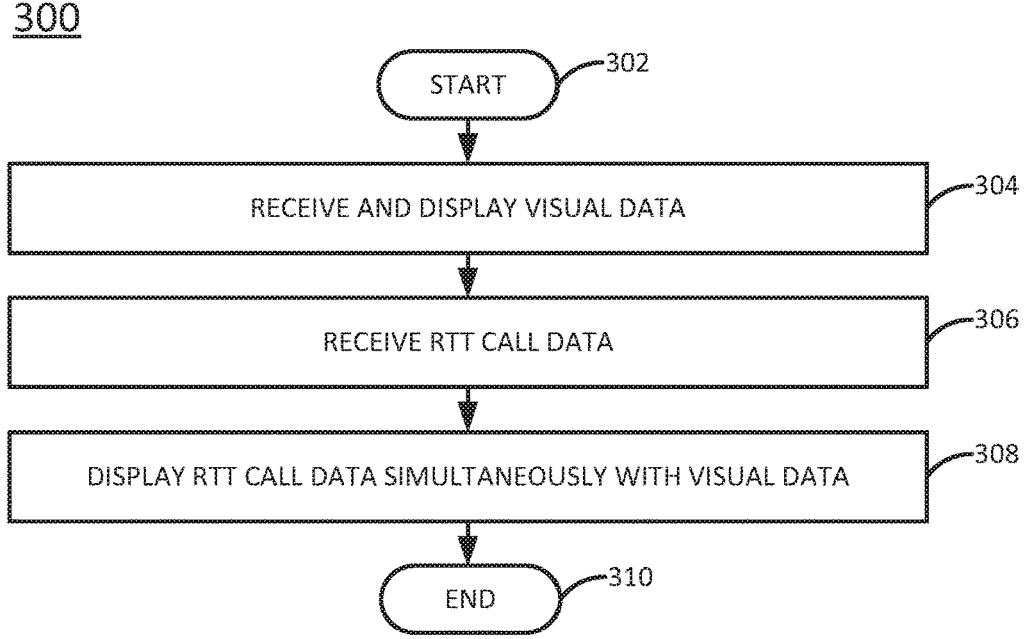
FIG. 3 illustrates a flowchart of another example method for integrating real-time text (RTT) communications with video services in accordance with the present disclosure.

FIG. 3 illustrates a flowchart of another example method 300 for integrating real-time text (RTT) communications with video services in accordance with the present disclosure. In one example, the method 300 may be performed by a device in a home network that includes a display, such as the TV 108, the smart TV 110, or the PC 116 illustrated in FIG. 1. However, in other examples, the method 300 may be performed by another device. As such, any references in the discussion of the method 300 to the home network devices (or to any other components of FIG. 1) are made for the sake of example only, and are not intended to limit the means by which the method 300 may be performed.

The method 300 begins in step 302. In step 304, visual data (e.g., a television broadcast, a video-on-demand stream, a satellite broadcast, a video game, or the like) is received and displayed by a display device. The visual data may be received directly from a home gateway (e.g., home gateway 104 of FIG. 4), or may be received via an intermediary such as a set top box or router (e.g., STB/DVR 106 or router 114 of FIG. 1).

In step 306, RTT call data is received, e.g., from the same source as the visual data. As discussed above, the RTT call data may be received in response to a signal provided to the home gateway to redirect the RTT call data from a mobile or landline telephone. The RTT call data may comprise alphanumeric text, as well as emoticons, still images, video, and other visual data.

Figure 4:
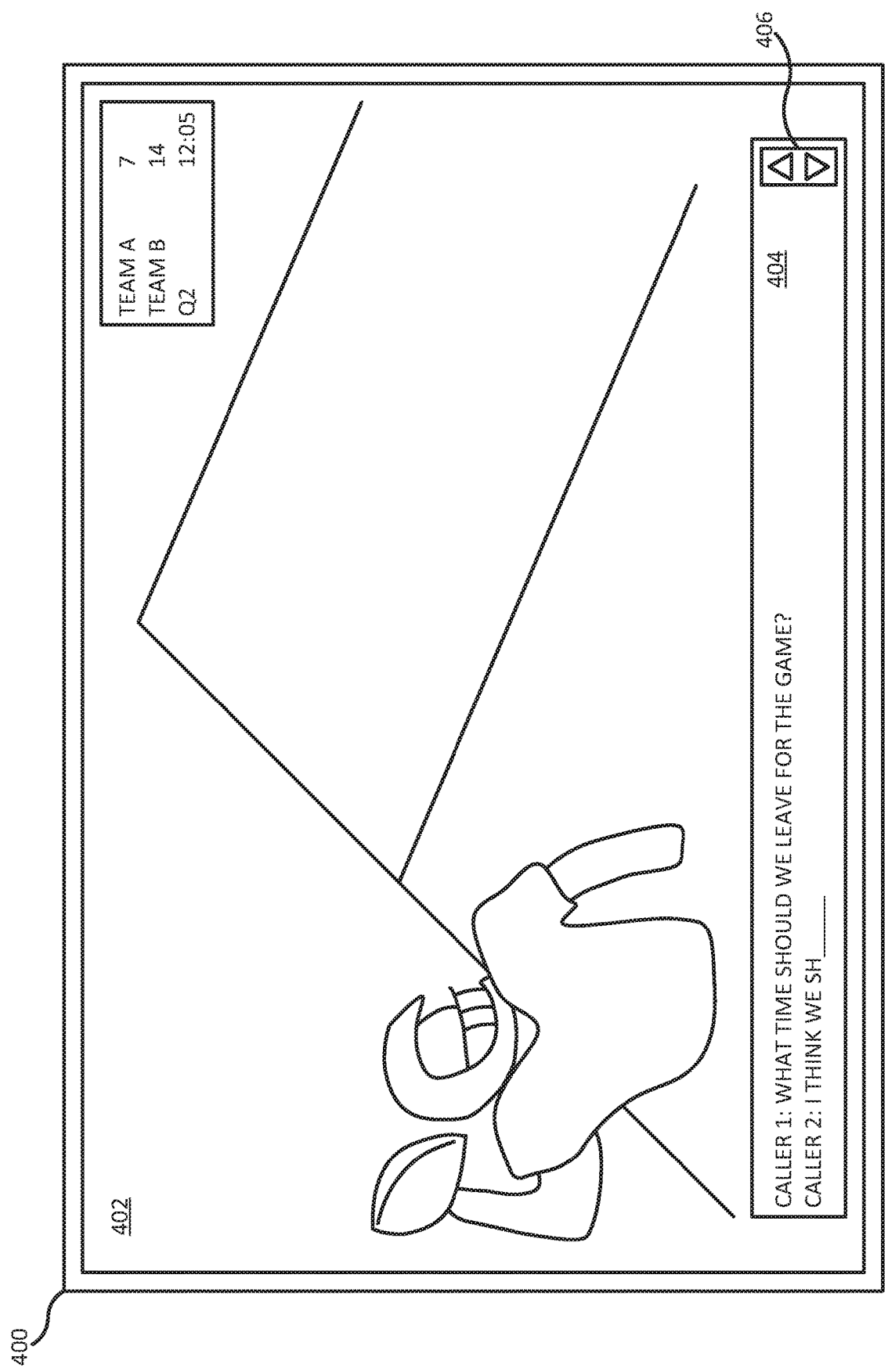
FIG. 4 illustrates one example of a device that can display real time text in accordance with the method of FIG. 3.

In step 308, the RTT call data is displayed simultaneously with the visual data. FIG. 4, for instance, illustrates one example of a device 400 that can display real time text in accordance with the method 300 of FIG. 3. In one example, the device is a television. As illustrated, the television may display an image 402. For instance, the image may be part of a broadcast of a football game. When RTT call data is forwarded to the television, the RTT call data may be displayed in a designated area 404 of the display. In one example, the location of the designated area 404 is preselected to minimize interference with the display of other text on the display. For instance, closed captioning data is often displayed in the same area of a television display; accordingly, the designated area 404 might be positioned so that it does not overlap with the area reserved for closed captioning data.

As shown in FIG. 4, the real time text is displayed character-by-character, as the individual(s) type or otherwise create the text. A button 406 may allow for the viewer to scroll through the RTT conversation in the designated area 404. The button 406 could be controlled, for example through a remote control.

Referring back to step 308, the data streams containing the visual data and the RTT call data may be integrated (e.g., by a home gateway, a set top box, a router, a smart television, or another device) into a single stream prior to display. In other examples, however, other methods for forwarding the RTT call data to the second device are possible.

The method 300 ends in step 310. It will be appreciated that RTT call data may continue to be displayed by the second device until a signal is received to stop displaying the RTT call data or until no more RTT call data is received (e.g., the call ends). Moreover, call data may also be transmitted by the second device outside of the home network to another party on the call. For instance, the intended recipient who is viewing the RTT call data on the second device may respond to the person with whom he is conversing. The response could be provided in the form of text (e.g., real time text), or in the form of spoken utterances. Where the response comprises a spoken utterance, the second device (or another device to which the second device forwards the spoke utterance, such as an STB, a router, or a home gateway) may employ a microphone and/or employ speech recognition techniques to capture the spoken utterance and convert the spoken utterance to text. In one example, the second device may record the spoken utterance and forward the recording to the home gateway for speech-to-text conversion.

Thus, voice-to-RTT-to-screen and screen-to-RTT-to-voice calls are also possible. In other words, a first party on a call may provide RTT call data in text form (e.g., via a keypad of a computer of mobile phone), while a second party on the call may provide voice data in audible form (e.g., via a speaker of a telephone or other device) that is converted to text for the first party's benefit.

In further examples, the method 300 may include an additional step, e.g., between steps 404 and 406, in which at least one language translation application may be used to translate the RTT call data from a first language into a second, different language. In this case, the translation may be performed by the device to which the RTT call data is forwarded, rather than by the home gateway as discussed above.

Although not expressly specified above, one or more steps of the method 200 and/or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 and/or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Figure 5:
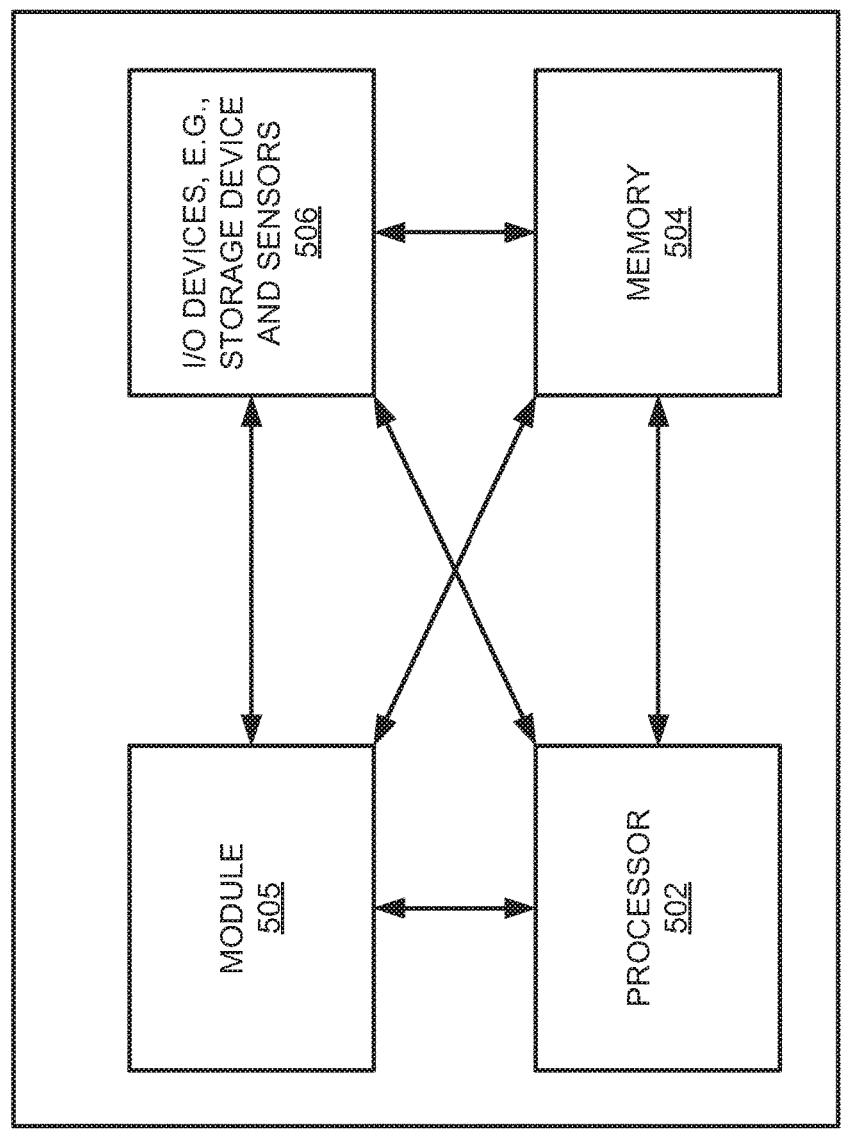
FIG. 5 depicts a high-level block diagram of a computing device specifically programmed to perform the functions described herein.

FIG. 5 depicts a high-level block diagram of a computing device specifically programmed to perform the functions described herein. For example, any one or more components or devices illustrated in FIG. 1 or described in connection with the method 200 and/or the method 300 may be implemented as the system 500. For instance, a home gateway 104, an STB/DVR 106, a smart TV 110, a router 114, or a PC 116 could be implemented as illustrated in FIG. 5.

As depicted in FIG. 5, the system 500 comprises a hardware processor element 502, a memory 504, a module 505 for integrating RTT communications with video services, and various input/output (I/O) devices 506.

The hardware processor 502 may comprise, for example, a microprocessor, a central processing unit (CPU), or the like. The memory 504 may comprise, for example, random-access memory (RAM), read-only memory (ROM), a disk drive, an optical drive, a magnetic drive, and/or a Universal Serial Bus (USB) drive. The module 505 for integrating RTT communications with video services may include circuitry and/or logic for performing special purpose functions relating to the monitoring and measuring data streaming performance. The input/output devices 506 may include, for example, a camera, a video camera, storage devices (including, but not limited to, a tape drive, a floppy drive, a hard disk drive, a compact disc drive, a flash drive, or a solid-state drive), a receiver, a transmitter, a speaker, a microphone, a display, a speech synthesizer, an output port, and a user input device (such as a keyboard, a keypad, a mouse, and the like), or a sensor.

Although only one processor element is shown, it should be noted that the general-purpose computer may employ a plurality of processor elements. Furthermore, although only one general-purpose computer is shown in the Figure, if the method(s) as discussed above is (are) implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for integrating RTT communications with video services (e.g., a software program comprising computer-executable instructions) can be loaded into memory 504 and executed by hardware processor element 502 to implement the steps, functions or operations as discussed above in connection with the example method 200 and/or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for integrating RTT communications with video services (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
receiving, by a processor of a home gateway deployed in a home network, a real time text call intended for a recipient in the home network;
forwarding, by the processor, the real time text call to a mobile phone in the home network;
receiving, by the processor, a signal from the mobile phone to redirect real time text call data to a television in the home network; and
forwarding, by the processor, the real time text call data to the television, in response to the signal, wherein the forwarding the real time text call data to the television comprises integrating a first data stream containing the real time text call data with a second data stream containing visual data into a combined data stream for the television to display, wherein the real time text call data is displayed character-by-character on a display of the television, wherein the display of the television includes a designated area in which the real time text call data is displayed, and wherein the designated area is distinct from another area of the display that is designated for the display of closed captioning text associated with the visual data.

2. The method of claim 1, wherein the real time text call data includes a still image.

3. The method of claim 1, wherein the real time text call data includes a video.

4. The method of claim 1, wherein the real time text call data includes an emoticon.

5. The method of claim 1, wherein the visual data is one of: a television broadcast, a video-on-demand stream, a satellite broadcast, or a video game.

6. The method of claim 1, further comprising:
translating the real time text call data from a first language to a different, second language prior to forwarding the real time text call to the television.

7. The method of claim 1, further comprising:
receiving a response in the form of a spoken utterance from the recipient, via the television;
converting the spoken utterance to text; and
forwarding the text to a source of the real time text call data.

8. A device, comprising:
a processor; and
a computer-readable medium storing instructions which, when executed by the processor when the device is deployed as a home gateway in a home network, cause the processor to perform operations, the operations comprising:
receiving a real time text call intended for a recipient in the home network;
forwarding the real time text call to a mobile phone in the home network;
receiving a signal from the mobile phone to redirect real time text call data to a television in the home network; and
forwarding the real time text call data to the television, in response to the signal, wherein the forwarding the real time text call data to the television comprises integrating a first data stream containing the real time text call data with a second data stream containing visual data into a combined data stream for the television to display, wherein the real time text call data is displayed character-by-character on a display of the television, wherein the display of the television includes a designated area in which the real time text call data is displayed, and wherein the designated area is distinct from another area of the display that is designated for the display of closed captioning text associated with the visual data.

9. A non-transitory computer-readable storage medium storing instructions which, when executed by a processor of a home gateway deployed in a home network, cause the processor to perform operations, the operations comprising:
receiving a real time text call intended for a recipient in the home network;
forwarding the real time text call to a mobile phone in the home network;
receiving a signal from the mobile phone to redirect real time text call data to a television in the home network; and
forwarding the real time text call data to the television, in response to the signal, wherein the forwarding the real time text call data to the television comprises integrating a first data stream containing the real time text call data with a second data stream containing visual data into a combined data stream for the television to display, wherein the real time text call data is displayed character-by-character on a display of the television, wherein the display of the television includes a designated area in which the real time text call data is displayed, and wherein the designated area is distinct from another area of the display that is designated for the display of closed captioning text associated with the visual data.

10. The non-transitory computer-readable storage medium of claim 9, wherein the real time text call data includes a still image.

11. The non-transitory computer-readable storage medium of claim 9, wherein the real time text call data includes a video.

12. The non-transitory computer-readable storage medium of claim 9, wherein the real time text call data includes an emoticon.

13. The non-transitory computer-readable storage medium of claim 9, wherein the visual data is one of: a television broadcast, a video-on-demand stream, a satellite broadcast, or a video game.

14. The non-transitory computer-readable storage medium of claim 9, wherein the operations further comprise:
translating the real time text call data from a first language to a different, second language prior to forwarding the real time text call to the television.

15. The non-transitory computer-readable storage medium of claim 9, wherein the operations further comprise:
   receiving a response in the form of a spoken utterance from the recipient, via the television;
   converting the spoken utterance to text; and
   forwarding the text to a source of the real time text call data.

16. The device of claim 8, wherein the real time text call data includes a still image.

17. The device of claim 8, wherein the real time text call data includes a video.

18. The device of claim 8, wherein the real time text call data includes an emoticon.

19. The device of claim 8, wherein the visual data is one of: a television broadcast, a video-on-demand stream, a satellite broadcast, or a video game.

20. The device of claim 8, wherein the operations further comprise:
   translating the real time text call data from a first language to a different, second language prior to forwarding the real time text call to the television.

* * * * *